United States Patent [19]

Newton

[11] Patent Number: 4,770,792

[45] Date of Patent: Sep. 13, 1988

[54] PROCESS AND APPARATUS FOR SEPARATING FLUIDS

[76] Inventor: George D. Newton, 8320 Winningham, Houston, Tex. 77055

[21] Appl. No.: 77,414

[22] Filed: Jul. 24, 1987

[51] Int. Cl.$^4$ ............................................. B01D 17/04
[52] U.S. Cl. .................................... 210/708; 210/799; 210/199; 210/498; 210/DIG. 5
[58] Field of Search ............... 210/194, 197, 199, 498, 210/708, 799, DIG. 5; 252/358

[56] References Cited

U.S. PATENT DOCUMENTS

| | | |
|---|---|---|
| 194,704 | 8/1877 | Means . |
| 1,503,004 | 7/1924 | Parker .............................. 138/40 X |
| 1,592,079 | 7/1926 | Chancellor et al. . |
| 1,662,296 | 3/1928 | Carlson . |
| 1,780,130 | 10/1930 | Heard . |
| 2,143,836 | 1/1939 | Anderson . |
| 2,560,416 | 7/1954 | Courtney . |
| 3,491,882 | 1/1970 | Elam .................................... 210/799 |
| 3,841,568 | 10/1974 | Broad .................................. 239/590 |
| 3,914,348 | 10/1975 | Kors et al. ...................... 239/555 X |
| 3,954,124 | 5/1976 | Self .................................... 138/40 X |
| 4,011,906 | 3/1977 | Alexander et al. ................. 166/105 |
| 4,057,493 | 11/1977 | Davies et al. ........................ 210/799 |
| 4,138,931 | 2/1979 | Hermann et al. ...................... 92/87 |
| 4,238,326 | 12/1980 | Wolf ............................... 210/708 X |
| 4,240,908 | 12/1980 | Swain et al. ..................... 210/708 X |
| 4,310,602 | 1/1982 | Martin, Jr. ...................... 210/498 X |
| 4,402,485 | 9/1983 | Fagerlund ......................... 138/41 X |
| 4,479,875 | 10/1984 | Nelson .......................... 210/DIG. 5 |
| 4,647,443 | 3/1987 | Apffel ................................. 423/449 |

FOREIGN PATENT DOCUMENTS

| | | | |
|---|---|---|---|
| 2410421 | 9/1974 | Fed. Rep. of Germany ...... 210/708 |
| 124559 | 9/1979 | Japan ................................. 210/708 |

Primary Examiner—Robert Spitzer
Attorney, Agent, or Firm—David M. Ostfeld

[57] ABSTRACT

A process and apparatus for separating a water emulsion from a hydrocarbon fluid is disclosed. The invention is practiced by conveying the fluids into contact with a metal which has a nickel content greater than seventy-five percent. The invention separates the water from the hydrocarbon fluids and reduces the quantity of paraffin solids which accumulate.

14 Claims, 1 Drawing Sheet

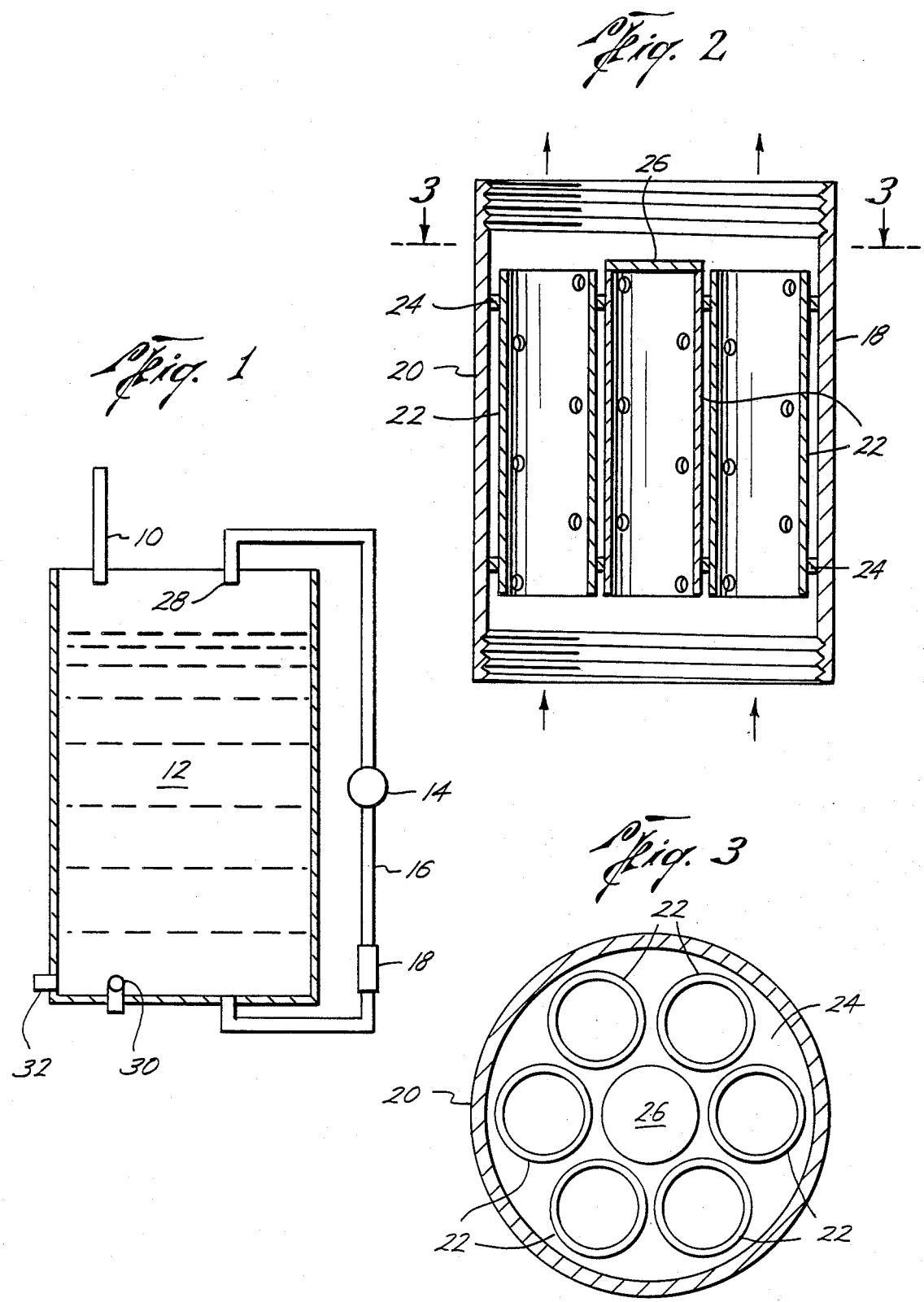

PROCESS AND APPARATUS FOR SEPARATING FLUIDS

FIELD OF THE INVENTION

The present invention relates to a process and apparatus for separating fluids and paraffin abatement. More particularly, the invention describes a process and apparatus for breaking emulsions of water and crude oil and other hydrocarbons, and preventing the accumulation of paraffin deposits.

BACKGROUND OF THE INVENTION

Hydrocarbons, such as crude oil produced from underground reservoirs, often contain many compounds which are entrained within the crude oil. For example, an oil well will frequently produce large quantities of water, gas, carbon dioxide, solids and crude oil. Certain of these constituents are not only undesirable components of the oil, but frequently are quite difficult to separate from the oil because they have become emulsified with the oil during production.

This is undesirable since purchasers of crude oil stored in tanks may reject the oil if the bottom sediment and water concentration in the tanks exceed one or two percent. Accordingly, the hydrocarbon fluids are commonly treated to separate the oil from the impurities that are produced with the oil.

When emulsion is not a factor, portions of the impurities in a tank, such as water, paraffin and other impurities, may eventually settle to the bottom of the tank due to differences in the specific gravity of the impurities. If these impurities are allowed to accumulate and solidify, the storage tank can be very difficult to treat and clean.

To prevent the accumulation of impurities at the bottom of storage tanks and to de-emulsify crude oil emulsions with the addition of chemicals, a "rolling process" can be used to circulate the hydrocarbon fluids, thereby dispersing the paraffin evenly throughout the crude oil and causing the solids and water to become de-emulsified and to segregate at the tank bottom for removal. The crude oil is then ready for sale. However, the adding of chemicals or use of other techniques involved with the "rolling process" require the addition of expensive chemicals or expensive manual labor, or the expense of energy for heating.

SUMMARY OF THE INVENTION

The present invention provides an improved process and apparatus for separating water from hydrocarbon fluids. The water emulsion in the hydrocarbons is removed by pumping the hydrocarbon through an apparatus which causes the hydrocarbons to come in contact with the metal having a nickel content greater than seventy-five percent. The process and apparatus treats the water emulsion and the hydrocarbon fluids so that the water separates from the hydrocarbon fluids when the fluids are returned to the storage tank. The process and apparatus accomplishes this result without permitting paraffin solids from accumulating.

BRIEF DESCRIPTION OF THE DRAWINGS

For a further understanding of the nature and objects of the present invention, reference is made to the following drawings in which like parts are given like reference numerals and wherein:

FIG. 1 illustrates an elevation view of a preferred embodiment of the present invention.

FIG. 2 illustrates a sectional view of a tube section of the present invention located within the flowline.

FIG. 3 illustrates a sectional view of the flowline and shows the location of tube sections within the flowline.

DESCRIPTION OF THE PREFERRED EMBODIMENTS

FIG. 1 illustrates one application of the present invention in separating water from hydrocarbon fluids such as crude oil. The crude oil and other hydrocarbons are produced from the underlying geologic reservoir and are pumped through the discharge hose 10 into storage tank 12. If the hydrocarbon fluids and impurities entrained within the hydrocarbons are not circulated, the impurities and the hydrocarbons will separate in in the storage tank based on the specific gravity of each compound. For example, heavier impurities such as water will settle to the bottom of the tank. The water may combine with paraffins in the crude oil to form deposits in the storage tank.

To prevent the paraffins from forming deposits, the hydrocarbon fluids in tank 12 are recirculated by withdrawing fluid from the lower end of tank 12 and pumping the fluids into the top of the storage tank. Fluids are withdrawn from tank 12 by pump 14 which is installed in flowline 16. Pump 14 may be a centrifugal or other type of sealed pump which can pump or otherwise convey fluids without leakage of the fluids into the surrounding environment. To separate the water emulsion from the crude oil and other hydrocarbons in the storage tank, separating tool 18 is shown as being connected between storage tank 12 and fluid line 16.

One embodiment of tool 18 is illustrated in FIG. 2. As illustrated, tool 18 comprises pipe section 20 which may be two inches in diameter and is shown with standard threads. Pipe section 20 may constitute part of flowline 16 or may be configured as a separate, discreet apparatus. Referring to FIG. 2, at least one tube section 22 is formed of a metal which has a high nickel content. Substantially one hundred percent is preferred, but it is believed that concentrations as low as seventy-five percent will also break emulsions and prevent accumulation of deposits. It is also known that nickle concentrations of fifteen percent or less do not substantially break emulsions or prevent accumulation of deposits.

Tube sections 22 are located within pipe section 20. In one embodiment, each end of tube section 22 is supported by spacer plate or bracket 24. Bracket 24 may be fabricated from 1018 carbon steel. As illustrated in FIG. 3, seven tube sections are shown as being located within pipe section 20. Tube sections 22 are rigidly welded to bracket 24 so that tube sections 22 do not contact pipe section 20 or the other tube sections. Tube sections 22 act as a contact to maximize the surface area of the metal which is in contact with the fluids.

In one embodiment, each tube section 22 is fabricated from a metal which has a nickel content greater than seventy-five percent. Each tube section 22 is perforated with holes drilled through the wall of the tube section. For example, a tube section that is eighteen inches long may have fourteen 3/16 inch diameter holes drilled into the tube on one inch vertical centers. The holes may be offset every thirty degrees around the circumference of tube section 22. Each tube section 22 has an open input end and an open output end to permit fluid in the flowline to be pumped through the tube section 22. In a preferred embodiment of the invention, the output end of one tube section 22 may be sealed by plugging the output end of the tube section with cap 26. After the output end of the tube section is sealed, fluid entering the input end of the tube section is forced radially through the perforated holes drilled through the wall of tube section 22. As fluid is pumped through pipe section 20, the fluids transversely forced through these perforations create a turbulent flow which efficiently mixes the fluid as it passes through pipe section 20.

To utilize the invention, fluid from storage tank 12 is pumped into the input end of pipe section 20 and through tube sections 22. The fluids are conveyed in contact with tube sections 22 in conjunction with a pressure at the upstream side of tube sections 22 of at least four pounds per square inch. In another embodiment of the invention, the fluid pressure upstream and downstream of tube sections 22 can be increased provided that there is a pressure differential of at least four pounds per square inch across tube sections 22. As the fluid passes through tube sections 22, the fluid contacts the metal surface of tube sections 22. Various techniques can be used to maximize the contact of the fluid with the nickel content of tube sections 22. For example, the embodiment discussed above, with the induced turbulent flow, increases the mixing action of the fluids. In other embodiments, various screens having a nickel content greater than seventy-five percent may be used to treat the fluids. The configuration of tube sections 22 is not essential to the operation of the invention since many configurations of the metal, such as configurations similar to a radiator, will accomplish the object of the invention.

After the fluids have contacted tube sections 22, the fluids are pumped through flowline 16 and through discharge port 28 into the upper end of storage tank 12. The water will settle to the bottom of storage tank because it has a greater specific gravity, defined as the mass per unit volume, than does the hydrocarbon fluids. Once the water has settled to the bottom of storage tank 12, the water can be withdrawn from storage tank 12 through valve 30. After the water has been removed from the storage tank, the remaining hydrocarbon fluids can be withdrawn from storage tank 12 through valve 32 or by other means.

The invention furnishes an improved process and apparatus for seperating a water emulsion from hydrocarbon fluids in a flowline or a storage tank. The invention operates without the addition of costly chemicals or without the need for using additional energy to heat the hydrocarbon fluids to remove the emulsion. Although the invention is illustrated in conjunction with a storage tank used to store hydrocarbon fluids that have been removed from an underground reservoir, the invention is applicable to many applications where hydrocarbons are being stored. For example, the invention is useful in pipelines, tanker trucks or with ships that may be used to transport the liquid hydrocarbons.

It is apparent that many other variations of the process and apparatus described herein may be made without departing from the scope of the present invention. Because many varying and different embodiments may be made within the scope of the inventive concept herein taught, including equivalent structures and materials hereafter thought of, and because many modifications may be made in the embodiments herein described in accordance with the descriptive requirements of the law, it is to be understood that the embodiments set forth herein are illustrative and should not limit the scope of the invention.

What is claimed is:

1. A process for separating an entrained water emulsion from a hydrocarbon fluid and dispersing paraffin located in a flowline, comprising the step of conveying the fluid under pressure through the flowline so that the fluid contacts a metal containing at least seventy-five percent nickel in conjunction with a pressure at the upstream side of the metal of at least four pounds per square inch.

2. A process as recited in claim 1, wherein said fluid is conveyed by pumping the fluid through the flowline.

3. A process for separating an entrained water emulsion from a hydrocarbon fluid and dispersing paraffin located in an storage vessel, comprising the steps of:
   discharging the fluid from the storage vessel and into a flowline;
   conveying the liquid and entrained water emulsion into contact with a metal containing at least seventy-five percent nickel and being located within the flowline in conjunction with a pressure at the upstream side of the metal of at least four pounds per square inch; and
   returning the fluid and water emulsion to the storage vessel to permit the water to separate from the fluid.

4. A process as recited in claim 3, wherein the fluid pressure on the downstream side of the metal is less than the fluid pressure on the upstream side of the metal so that there is a pressure differential across the metal of at least four pounds per square inch.

5. A process as recited in claim 3, wherein the fluid is discharged from the lower end of the storage vessel and into a flowline.

6. A process as recited in claim 3, further comprising the step of removing the water from the storage vessel.

7. An apparatus for separating an entrained water emulsion from a hydrocarbon fluid and dispersing paraffin located in a flowline, comprising:
   a pipe section containing the hydrocarbon fluid and entrained water; and
   a metal contact, containing at least seventy-five percent nickel, located within said pipe section and in contact with the hydrocarbon fluid and entrained water.

8. An apparatus as recited in claim 7, further comprising a bracket connected between said pipe section and tube section for retaining said tube section within said pipe section.

9. An apparatus as recited in claim 7, wherein said tube section is perforated with holes.

10. An apparatus as recited in claim 7, further comprising a perforated metal tube section containing at least seventy-five percent nickel and having a closed outlet end wherein the hydrocarbon fluid and entrained water is conveyed into the open, inlet end of said tube section and is discharged through the perforations in said tube section.

11. An apparatus as recited in claim 7, further comprising:
   a storage vessel;
   a flowline connected between the lower and upper ends of said storage vessel and in fluid contact with said pipe section; and
   a pump for drawing the hydrocarbon fluid and entrained water from the lower end of the storage vessel, through said flowline and said pipe section, and for discharging the hydrocarbon fluid and entrained water into the upper end of the storage vessel.

12. An apparatus as recited in claim 11, wherein said metal contact comprises a perforated metal tube section.

13. An apparatus as recited in claim 11, further comprising a perforated metal tube section having an open inlet end and a closed outlet end to force fluid through the perforations as the fluid is conveyed into the open inlet end.

14. An apparatus as recited in claim 11, further comprising a bracket connected between said metal contact and said flowline for retaining said metal contact within said flowline.

* * * * *